Aug. 11, 1959 N. CUSHMAN 2,899,631
TRANSFORMER STRUCTURES
Filed July 11, 1955
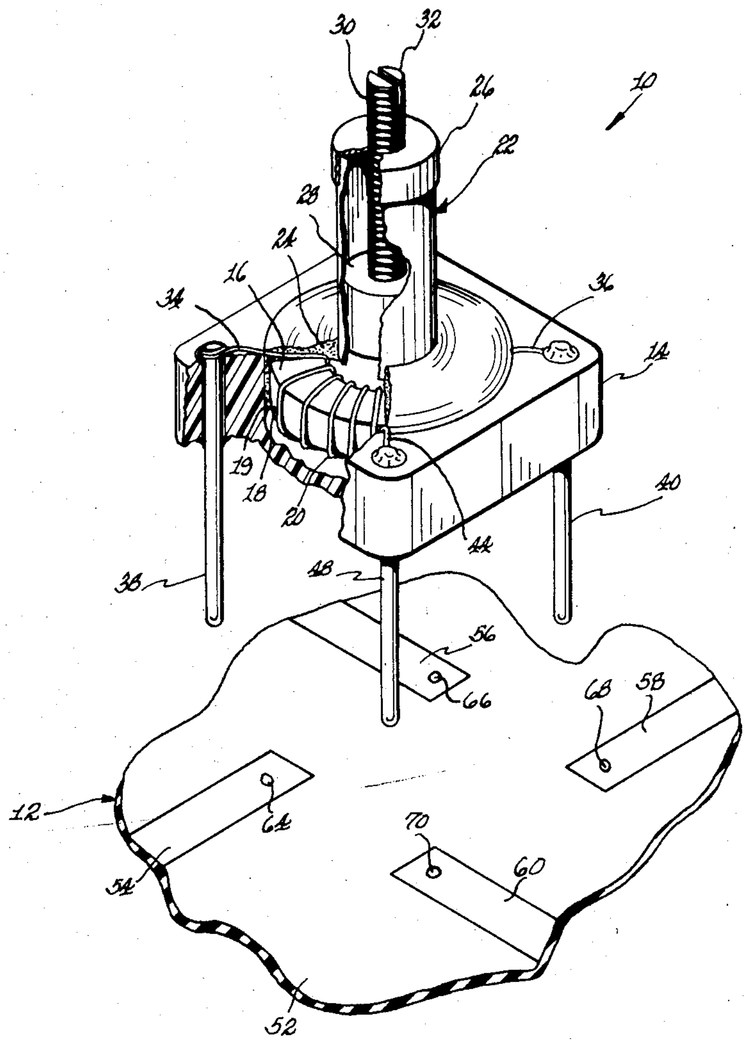
INVENTOR.
NORTON CUSHMAN
BY
Connolly and Hutz
HIS ATTORNEYS

United States Patent Office 2,899,631

Patented Aug. 11, 1959

2,899,631

TRANSFORMER STRUCTURES

Norton Cushman, Williamstown, Mass., assignor to Sprague Electric Company, North Adams, Mass., a corporation of Massachusetts Application July 11, 1955, Serial No. 521,123

1 Claim. (Cl. 323—44)

This invention relates to transformers, and more particularly to such transformers for incorporation into printed circuits or the like.

Automatic assembly techniques reduce the labor time and cost of electrical and electronic assemblies. The use of printed circuits is an important phase of this automation. When components must be specifically aligned with a printed board before mounting, the automatic assembly machinery becomes complicated.

An object of this invention is to provide a structure for a transformer that simplifies the mounting operation.

In accordance with this invention, a transformer is provided with terminals that can be connected in a circuit without requiring special orientation. By providing the transformer with windings that are similar, one-to-one for example, and having each winding separately connected to an opposite pair of terminals in a radially symmetrical terminal assembly, the windings will be properly inserted in a circuit regardless of how the terminals are oriented.

The above as well as other features of the present invention will become more apparent from a reading of the following description in conjunction with the accompanying drawing in which the single figure is a perspective exploded view of one embodiment of this invention.

In the single figure of the drawing, a one-to-one ratio transformer 10 is shown in position for connecting with a portion of a printed circuit on a board 12. This transformer is, for example, an I.F. transformer of the one-to-one ratio type which can be used in various electronic assemblies (such as radio or television receivers, for example). The transformer 10 includes a base 14 made of an electrical insulating material such as Bakelite resin which is fairly strong and shock resistant.

A core 16 of magnetic material is positioned within an aperture 18 in the base. This core is made of a ferrite, for example, and around it are coiled two windings, one of which is shown at 20. For a description of suitable windings and cores for a transformer of this type, as well as a description of suitable materials for use in making up the components of this transformer, reference is made to copending application Serial No. 427,642, filed May 4, 1954, and copending application Serial No. 411,537, filed February 19, 1954 (now U.S. Letters Patent 2,823,362, issued February 11, 1958). The core 16 is fastened within the aperture 18 by means of a cement shown at 19 which is, for example, a thermosetting resin.

A tuning means 22 is fastened to the upper portion of core 16 by a cement shown at 24. This cement may also be a thermosetting resin. The tuning means 22 includes an enclosure 26 within which a slug 28 is movably supported by means of a screw 30. This screw 30 extends through the enclosure and has a slotted end 32. A screwdriver, not shown, may be inserted in the slotted end 32 for tuning the transformer. The windings are, for example, windings of the type described in copending application Serial No. 458,137, filed September 24, 1954. In this copending application are described toroidal cores which have relatively high flux concentrations and actual or effective air gaps. These cores are well adapted for tuning by movement of slug 28 with respect to the air cap. A tunable toroid and slug, of the type described, is more specifically described in copending application Serial No. 448,833, filed August 10, 1954. Movement of the slug towards and away from the core provides a close control over the inductance of the transformer. Details of this tuning structure are provided in the aforementioned copending application Serial No. 448,833.

The opposite leads 34 and 36 of one of the transformer windings are led to the upper portions of pins 38 and 40 which are mounted in opposite corners of the base 14. Leads 34 and 36 are respectively soldered to pins 38 and 40. Leads 44 and 46 (not shown) are similarly soldered to pins 48 and 50 (not shown).

The printed circuit board 12, shown immediately below transformer 10, is made up of a sheet of electrical insulating material 52. This insulating material may be a sheet of Bakelite, for example. Strips 54, 56, 58 and 60, of a conductive metal, copper for example, provide circuit connections for the transformer. These conductive strips respectively include terminal holes 64, 66, 68 and 70.

The pins 38, 40, 48 and 50 of the transformer are equidistantly disposed about the base of the core. They are four in number and, therefore, form the corners of an imaginary square. The holes 64, 66, 68 and 70 on the printed circuit board form corners of an identical imaginary square. The leads for each transformer winding are diagonally opposed across corners of this imaginary square. Holes 64, 68 are, therefore, included in one winding circuit, the primary for example, and holes 66 and 70 are, therefore, included in another winding circuit. Diagonally opposed pins of the transformer are likewise connected to a single winding within the transformer. Pins 38 and 40, therefore, connect across one winding while pins 48 and 50 (not shown) connect across the other winding.

When the transformer pins are inserted within the holes in the printed circuit board, the transformer must be properly mounted upon the board. This is true because each of the windings may be connected into either of the printed circuits. Regardless of how the transformer pins are rotated before being plugged into the circuit, one winding will be connected between connectors 54 and 58, and the other winding between connectors 56 and 60.

In the interest of compactness, it is desirable to make the transformer as small as possible. The transformer base could be made rectangular to provide orientation discrimination between the long edges and the short ones, but this means that the base has to be made larger than one in which the terminals are radially disposed.

In high electric stress applications it is desirable to provide an arc gap adjacent those leads between which the high voltage is compressed. The mounting base may be cut out in the vicinity of these leads to prevent breakdown of the base at this point or the collection of particles such as dust which may facilitate breakdown.

The advantages of the present invention are also obtained if the transformer has 3, 4 or more windings. So long as the windings are similar and each is connected to a pair of opposite terminals in a radially symmetrical group, the terminals need not be oriented in the circuit.

The transformers can make use of the above advantages whether they have projecting pins, or any other type of terminals, even recessed ones. With printed circuits, however, it is desirable not to use separate sockets in which the transformer can be plugged. Most standard types of sockets inherently provide or require critical orientation.

The transformers of the present invention can be either untuned, single tuned, double tuned, etc. For example, instead of having a single tuning member as in the figure of the drawings, each winding can be separately tuned as by means of a separate slug, either of the high permeability type for increasing the inductance or of the non-magnetic high conductivity type for decreasing the inductance. Furthermore, where tuning is provided it can be arranged to vary the capacitance of a capacitor connected to the inductor with or without varying the inductance.

Obviously many modifications and variations of the present invention are possible in the light of the above teachings. It is, therefore, to be understood that within the scope of the appended claim the invention may be practiced otherwise than as specifically described.

What is claimed is:

The combination of a plug-in type transformer and a printed circuit board; said transformer comprising a pair of substantially identical transformer windings, a base having four radially symmetrically disposed terminal pins, the ends of said windings being separately connected between diametrically opposed pairs of said terminal pins; said printed circuit board comprising four radially symetrically disposed pin receiving openings, a pair of circuits having ends separately connected to diametrically opposed pairs of said openings; said pins of said transformer and said openings of said board so constructed and arranged that said transformer will be properly oriented in said board regardless of how said pins are inserted in said openings.

References Cited in the file of this patent

UNITED STATES PATENTS

| | | |
|---|---|---|
| 1,492,496 | Vernor | Apr. 29, 1924 |
| 2,248,044 | Dehmel | July 8, 1941 |
| 2,343,675 | Kenyon | Mar. 7, 1944 |
| 2,455,875 | Peterson et al. | Dec. 7, 1948 |
| 2,586,854 | Myers | Feb. 26, 1952 |
| 2,732,529 | Reid et al. | Jan. 24, 1956 |
| 2,773,159 | Taggart | Dec. 4, 1956 |

OTHER REFERENCES

"Wizardry in Circuitry," Reprinted from April 1954, Modern Plastics, vol. 31, No. 8 (10 pp).